(12) United States Patent
Zhu

(10) Patent No.: US 9,745,047 B2
(45) Date of Patent: *Aug. 29, 2017

(54) AIRCRAFT GENERATING A LIFT FROM AN INTERIOR THEREOF

(71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,350

(22) Filed: Jun. 4, 2014

(65) Prior Publication Data

US 2016/0229517 A1  Aug. 11, 2016

Related U.S. Application Data

(62) Division of application No. 13/864,370, filed on Apr. 17, 2013, now Pat. No. 8,910,903.

(51) Int. Cl.
| | |
|---|---|
| *B64C 15/00* | (2006.01) |
| *B64C 3/14* | (2006.01) |
| *B64C 21/10* | (2006.01) |
| *B64C 39/02* | (2006.01) |
| *B64D 27/02* | (2006.01) |

(52) U.S. Cl.
CPC ............. *B64C 3/141* (2013.01); *B64C 21/10* (2013.01); *B64C 39/026* (2013.01); *B64D 27/02* (2013.01); *B64C 2230/26* (2013.01); *Y02T 50/12* (2013.01); *Y02T 50/166* (2013.01)

(58) Field of Classification Search
None
See application file for complete search history.

(56) References Cited

U.S. PATENT DOCUMENTS

| | | | | |
|---|---|---|---|---|
| 8,448,892 B2* | 5/2013 | Zhu | .......... | B64C 3/141 244/12.1 |
| 8,910,903 B2* | 12/2014 | Zhu | .......... | B64C 3/141 244/12.1 |
| 2011/0001000 A1* | 1/2011 | Zhu | .......... | B64C 3/141 244/12.1 |
| 2013/0306803 A1* | 11/2013 | Zhu | .......... | B64C 3/141 244/23 C |

* cited by examiner

*Primary Examiner* — Medhat Badawi
(74) *Attorney, Agent, or Firm* — Stein IP, LLC

(57) ABSTRACT

The invention discloses an aircraft generating a larger lift from its interior. The fluid channel inside the aircraft communicates with the engine and the ports on the upper surface of the outer shell. With the powerful suction of the engine, the fluid on the upper surface of the outer shell is quickly sucked into the fluid channel via respective ports under conditions of long path, large area, high speed and low air pressure, which results in large lift from the interior of the aircraft. In the course of generating the lift, the fluid resistances of the fluid wall and the fluid hole are sucked into the fluid channel through the ports at the front and the surrounding area of the aircraft, then high-speed fluid is emitted from the rear port. This approach contributes greatly to the transformation of the existing aircraft. The unified big wing significantly improves the lift, the speed and the carrying capacity of the existing aircraft with lowered energy consumption.

6 Claims, 8 Drawing Sheets

AIRCRAFT GENERATING A LIFT FROM AN INTERIOR THEREOF

This is a divisional application of the U.S. patent application Ser. No. 13/864,370.

BACKGROUND OF THE INVENTION

Field of the Invention

This invention relates to an aircraft, especially to an aircraft with more power lift.

Related Prior Art

Aircraft has been around for about a hundred years. Its lift force comes from a propeller and wings which produce limited lift force with high energy consumption. However, this invention is an aircraft having no wing and propeller but generating greater lift from its interior. In the course of generating the lift, the fluid resistance significantly reduces. This method modifies the traditional aircraft to improve lift and speed while reduce power consumption.

Conventional prior art discloses the proposed vehicle was in fluid-hole large negative pressure zone formed by closing a fluid wall, a fluid hole, and a fluid mouth, the fluid resistance of a moving car can be greatly reduced as long as the fluid hole mouth can be avoided to be closed.

Through a further study, it is found that a vehicle body fast moving in the fluid can have significantly reduced energy consumption and improved speed as long as the fluid entrance can be avoided to be closed.

Another conventional prior art discloses that the fluid layer on the wing communicates with the fluid passage of the fuselage, unifying the fuselage and wing to be a large wing so as to increase the area of the original wing. Thereby, the fluid travels much longer along the unified big wing at higher speed, thus significantly increasing the lift.

SUMMARY OF THE INVENTION

The object of the invention aims at resolving the main technical problem, and thus provides an aircraft with a bigger lift from its interior, greatly reduced fluid resistance, effectively improved speed and power efficiency, significantly reduced energy consumption, and simplified structure, which can be achieved by modifying a conventional aircraft vehicle.

To overcome the above technical problems, technical solutions used in this invention are:

1. There is a fluid channel within the aircraft fuselage. On an upper surface of the fuselage is located at least one port with a fluid channel communicated with an engine. With the action of powerful suction of the engine, an external fluid each the engine through the internal fluid channel from the port on the upper surface. Because of the long path length, large area and fast fluid speed from the port to the engine, the pressure is naturally low. Such a powerful suction state of the engine forces the fluid to rapidly fast flow through the fluid channel, resulting in a huge lift inside the aircraft and then onto the upper external surface thereof. There generates a tremendous pressure difference between the upper external surface and a lower external surface of the aircraft on which the fluid flows at normal speed. This pressure difference creates a great life which is controllable through the engine or the port.

2. In the course of lift generation for a new aircraft, the ports at the front-end and around the fuselage communicate with the fluid channel and the exits at the back-end. Thereby, the fluid resistance at the fluid wall and the fluid hole is drained out from the exits to avoid the fluid hole from being blocked, changing the fluid distribution. The fluid resistance is therefore greatly reduced.

3. The big wing is formed by unifying the engine and the fluid channel with the fuselage and the wings, which can be achieved on the existing aircraft, to increase the lift and the speed while decrease the energy consumption.

The engine as described above is located in the fluid channel. The engine has an air-in vent communicating with one of the ports on the above-mentioned external surface of the aircraft, and an air-out vent communicating with one of the above-described exits.

Said engine drives the fluid to flow within said fluid channel, so that the flow speed of the fluid inside said fluid channel and on the external upper surface communicating with the fluid channel is greater than that on the external lower surface where the fluid naturally flows. Thereby, a pressure difference is created on the external lower surface of the aircraft.

In a preferred embodiment according to the invention, the external upper surface of the fuselage and the wings communicate with the fluid channel and the engine to form a big wing having the fluid channel inside thereof. With the action of the engine's power, the speed of the fluid which flows through the fluid channel from the external upper surface of the big wing is greater than that on the external lower surface in natural state, so that there creates a generate pressure between the top and bottom of the fuselage, between upper half part and lower half part of the fuselage, or between the peripheral part and the lower surface to form the lift.

In a preferred embodiment, each port communicates on the surface of said fuselage. The port of the upper surface is a first port. The ports on both sides or surrounding area thereof is second ports. The port on the lower surface of the bottom thereof is a third port. The port on the upper surface of the wing is the forth port. The port at the front in the movement direction is a fifth port. At least one of said ports has a controller and an electrically controllable door or spoiler panel connected to said controller. Said controller controls the opening and closing of the electrically controllable door or the spoiler panel, and the altering of the air-guiding angle of the spoiler panel, so as to control the amount of the charged air at different parts of the fuselage and further control the flight direction or lift for the aircraft.

In a preferred embodiment, described spoiler board curved surface and lower surface of the plane, or the upper and lower surfaces are curved, flat, feather surface or surface scales.

In a preferred embodiment, said equipment main body has feather-like or scale-like surfaces over a part or the whole external topography so that it uses the feather-like surfaces in the air while scale-like surfaces in the water.

In a preferred embodiment, said equipment main body and wings include an outer shell and a closed inner shell. The fluid channel is located between the outer shell and the closed inner shell. The equipment main body has a chamber structure having partitions therein. A bending or folding space of the fluid passage forms by the partitions or between the partitions and the chamber.

In a preferred embodiment, the only one port of the aircraft is the fifth port on the upper surface of the wing to communicate with the fluid channel of the fuselage, the fluid passage of the wing and the engine.

In a preferred embodiment, the controller controls the opening, closing and the angle of ports in different locations on the outer shell of the aircraft, so that a pressure difference forms between the opened ports and the closed ports, and between the surface and the surrounding area of the fuselage to create a lift needed for taking off, landing and changing the flight direction.

In a preferred embodiment, said fifth port has the same size as windward side at the front of the aircraft.

In a preferred embodiment, said equipment main body has a shape of triangle, diamond, square, round, semi-circle, oval, pyramid or garment, and can move in the air, in the water and on the ground.

Said equipment main body which can move in the air and water has a fluid channel communicating with a suction engine. An air-in vent and an air-out vent of the engine can be closed in the water. The fluid channel is an air channel when communicating with the air, and is a water channel when communicating with the suction engine in the water. In this case, the fluid channel is used for water storage.

Said aircraft has its side wings connecting to each other on the top of the fuselage to form a circular wing. Said circular wing includes an inner shell and an outer shell. Between the inner shell and the outer shell is a fluid passage communicating with the fluid channel of the fuselage and the engine.

Said garment-shaped aircraft includes an outer covering and an inner covering. A fluid channel forms between the outer covering and the inner covering, surrounding the user's body and communicating with the engine.

In a preferred embodiment, the equipment main body able to move in the air and on the ground is an inflatable car. The inflatable car has an outer shell and an inner shell, either of which is an inflatable layer, or between which is located an inflatable layer. At the bottom of the equipment main body, spoiler panels are located in a manner that a convex surface of one spoiler panel faces a concave surface of its neighboring spoiler panel.

In a preferred embodiment, a plurality of engines are arranged around the middle of the fuselage of a flying saucer, or an engine is located in the middle of the bottom of the engine. The engine has an air-in vent communicating with the fluid channel, and an air-out vent communicating with a steering cylinder and an exit.

In a preferred embodiment, said fifth port has a cone-shaped rotating head driven by a motor to throw the fluid coming from the forward direction to the surrounding direction.

In a preferred embodiment, said aircraft generating the lift is the helicopter. The engine is located at the middle of the bottom or the tail of the helicopter. Said port is located under the helicopter's propeller and communicates with the fluid channel and the engine. Alternatively, the port is located at the middle of the bottom of the helicopter, between the upper surface of the fan driven by the engine and a lower shell of the fuselage.

In a preferred embodiment, the aircraft generating the lift is an inflatable aircraft including an inner shell and an outer shell. The inner shell and the outer shell of the inflatable aircraft are inflatable layers.

In a preferred embodiment, through the control of opening and closing of the ports by the controller, the aircraft gains or eliminates the lift.

In a preferred embodiment, the aircraft is an airplane with the engine in its wings, on both sides of its fuselage.

This invention provides advantages as follows.

Since the aircraft appeared a hundred years ago, its lift sources came from the propeller and wings, the lift generated by the propeller is very limited. Furthermore, there is not big difference between the fluid path over the curved upper surface and the flat lower surface of the wing, and therefore the obtained lift is not great. However, in the invention, the internal fluid channel of the engine communicates with the port on the upper surface of the outer shell and the engine. With the powerful suction of the engine, the flow speed for the fluid inside the fluid channel and the upper surface is much larger than that on the external lower surface of the outer shell. A huge pressure difference forms between the upper surface and the lower surface of the aircraft, resulting in a great lift. This lift source comes from the fluid channel inside the aircraft. An enormous lift is full of the interior of the aircraft, and then extends to the exterior through each port of the upper surface of the aircraft. With the powerful suction of the engine, a lift generated from inside to outside in this invention, which is much greater than that generated in natural state in a conventional airplane. It is a great improvement in the airplane history, because the lift passively generated in the natural state is turned to be an actively generated lift. The amount of the lift can be controlled through the control of the engine power.

2. The front and the surrounding area of the aircraft is a positive fluid pressure zone, while the rear thereof is a negative pressure zone. Therefore, the best solution to reduce the fluid resistance for the aircraft is to reduce the fluid resistance is to reduce the fluid resistances at the front fluid wall and the surrounding fluid hole while avoid the fluid hole mouth from being closed. When the aircraft moves in the ideal fluid state, the flight speed increases and more energy is saved.

3. The transformation of the existing aircraft is to provide the wing with a port as the exclusive air-in vent. With the powerful suction of the engine, the flow speed for the fluid on the upper surface of the wing is much larger than that on the lower surface thereof. A huge pressure difference therefore forms between the upper surface and the lower surface, resulting in a great lift. This is very important to the transformation of the existing aircraft. Furthermore, the fluid channel, the fuselage and the wings are unified as a big wing through each port on the upper surface of which even more greater pressure difference generates between the upper surface and the lower surface with the action of the powerful suction of the engine. The big wing has bigger area than the existing wing and has higher fluid speed on the upper surface than the lower surface, resulting in a greater lift than the prior art.

4. At present, no flight vehicle has been found to be able to fly in the air as flexibly as a bird with very little energy for long-distance flight. In order to create a flight aircraft overcoming the above disadvantages, it needs to imitate the mechanism of the bird feathers on their wings. A feather-like layer covers with another feather-like layer. The controllers control the respective feather-like spoiler panels like the bird controls the layers of the feathers, so that the fluid can flow through the multi-layers of spoiler panels as if through the layers of bird's feathers. Thereby, the aircraft can move as flexibly as a bird with lowered energy. Since the aircraft of the invention has the flight mechanism imitating the bird, the fluid will not leave from the wing to let the aircraft in a lost-speed state even when the aircraft tilts at 60°-70°. If the aircraft malfunctions, the pilot has more opportunities to escape by gliding the aircraft.

5. The bird and fish has been through a few million years of evolution and it has been found that feathers and scales are the best way to reduce the fluid resistance. Therefore, the fluid-contacting surfaces with feathers and scales perform better than smooth and flat surfaces in reduction of the fluid resistance. A plurality of feathers and scales are arranged both vertically and horizontally in layers in a manner to imitate the real feathers and scales. It looks like a plane but actually each feather-like or scale-like surface has a protruding center slightly downward extending to the periphery thereof, forming a slightly curved surface. When the fluid flows along a plurality of branches of feathers on the above curved surfaces from the center downward to the periphery thereof, or when the fluid flows along the curved scale, the fluid path is longer, the fluid flows faster with reduced resistance. The feather-like or the scale-like can be made of metal, plastics, glass, steel, carbon fiber and leather.

6. The airplane gets the lift from the wings, while the airship obtains the lift due to its weight lighter than air, which demonstrate two very different sources to get the lift. The combination of the airplane and airship creates the new aircraft having the advantages of both.

7. When the present invention applies to an inflatable car, it can move in the air by generating or eliminating the lift through the control of the ports. It can move on the ground when the lift is eliminated and becomes the lightest and most energy-efficient car in the world. It can move with minimal power, so that cars with green energy sources such as fuel cells, compressed air, solar energy, etc. become a reality.

DESCRIPTION OF THE INVENTION

For the detailed description of the technical content, structural characteristics, the realization of the purpose and effect according to this invention, the following combination of implementation will be illustrated with the accompanying detailed drawings.

Existing aircrafts have at least the two following disadvantages: First, the source of lift for the current aircraft having wings of curved upper surfaces and plane lower surfaces comes from the propeller and the wings. The fluid flows through the area with small topographic difference between the upper and lower surface, resulting in a small pressure difference and thus generating a small lift. Consequently, the aircraft has small carriage capacity, low speed and high energy consumption.

Figure 1:
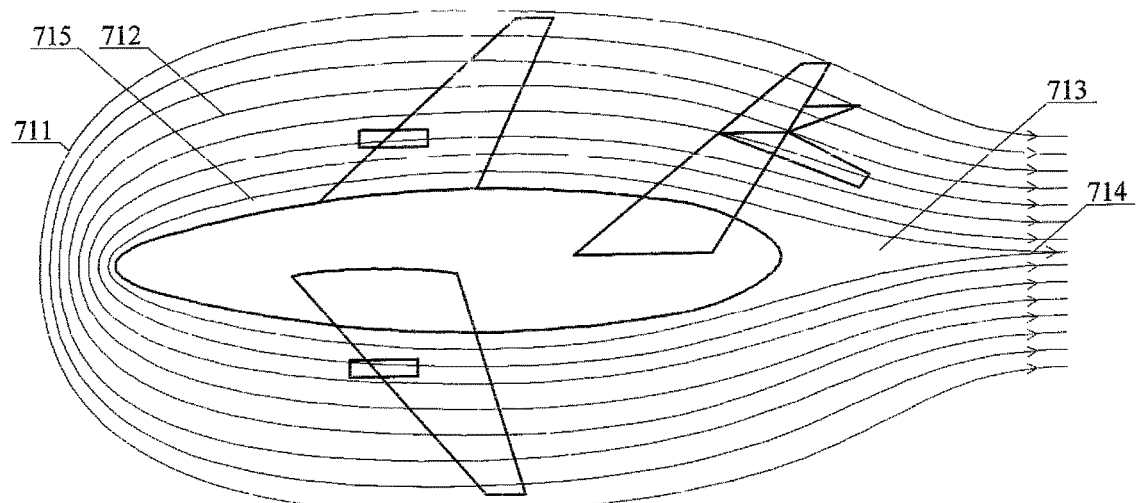
FIG. 1 is a schematic view showing the resistance when an existing airplane moves.

Secondly, as shown in FIG. 1, when the existing aircraft moves fast in the fluid, it hits face-to-face onto the fluid with equivalent velocity to the airplane, as if the head of the airplane hits onto a thick wall formed by the fluid. Therefore, the front-end of the aircraft becomes the largest positive pressure zone. The thick fluid wall instantaneously forms a thick fluid hole which tightly wraps around the aircraft. The faster the velocity and the larger the thickness of the fluid around the hole, the fluid hole has greater resistance to give the aircraft more positive fluid pressure. At this point, the fluid hole embraces the aircraft. Regardless of the fluid path length, the fluid reaches a certain distance from the rear instantly to close the fluid hole mouth. A small negative pressure zone is between the rear of the aircraft and the fluid hole mouth, tightly holding the rear of the aircraft to bring resistance to the aircraft. After long-term observations by the inventor, it has been found that the actual situation is far worse than such a situation. The aircraft is forced to be in a large negative pressure zone after the fluid hole mouth is closed. The pressure generated by high speed flow of the fluid in this large negative pressure zone inside the fluid hole is significantly different from the pressure outside the fluid hole. When the aircraft moves, the large negative pressure zone is driven to hit the fluid wall, then forms another fluid hole and closes the fluid hole mouth, rendering the movement of the aircraft more and more difficult for the majority of energy is consumed in the large negative pressure zone. This is the main reason why the current aircraft has high energy consumption and it is hard to increase the flying speed. More detailed description here below will be given to an airplane as an example.

FIG. 1 shows distribution of the fluid resistance of an existing airplane. As shown in FIG. 1, when the aircraft flies fast, its head contacts the maximal fluid resistance. As the fluid does not move relative to the airplane, the airplane instantly compresses the fluid into a fluid wall 711 with the equivalent velocity and thickness as the airplane. Then the airplane instantly enters the fluid wall. The high-pressure fluid embraces the airplane as if the airplane passes into a fluid hole 712 with a certain thickness. The faster the airplane, the thicker the fluid wall 711 with equivalent velocity to the airplane, resulting in greater resistance. Similarly, the greater the wall thickness of the fluid hole 712, the greater the lateral force applied inward onto the aircraft and the wings as if a python tightly wraps from the head to the end. The greater the lateral force, the greater the friction generated between the fuselage and the fluid hole 712 when the aircraft moves, especially when the aircraft has a longer fuselage. The resistance generated by the fluid-hole 712 is not less than the resistance generated by the forward fluid wall 711. The fluid forms a negative pressure zone 713 at a certain distance from the rear of the tail in order to maintain its continuity of arrival to the rear from the fuselage around the same time and then closes a fluid hole mouth 714. At this time due to curved and flat forms of the upper and lower surface of the wings, the difference of the fluid path where the fluid flows through is small. The fluid flows over the upper surface and the lower surface at different speeds but arrives at the same time, generating a small pressure difference and thus not much lift. The carriage power and the carriage speed are consequently not great. At this moment, the aircraft embraced by the fluid wall 711, the fluid-hole 712, the rear negative pressure zone 713, the fluid hole mouth 714 within a large negative pressure area 715. Because the aircraft is fast, the thickness of the fluid wall 711 accumulates as if the airplane instantly compresses the air into the fluid wall 711 of a certain thickness. The flow speed of the fluid hole 712 is equivalent to the flying speed of the aircraft. The flow speed of the fluid near the aircraft is equivalent to the aircraft speed with a gradient of gradually reducing from the aircraft until it vanishes. The faster the aircraft is moving, the thicker the fluid wall 711, and thus the thicker the fluid hole 712, resulting in the larger area of the rear negative pressure zone 713 and greater negative pressure. Therefore, the greater the negative pressure is around the aircraft in the large negative pressure zone 715 of the fluid hole. A high pressure difference is created between inside and outside of the fluid hole 712. The aircraft is enclosed in a big negative pressure zone of the fluid hole 715, adding a heavy burden to the large negative pressure area 715 to crash the fluid wall 711 periodically. The fluid hole 712 and the rear negative pressure zone 713 are thus formed and then the fluid hole mouth 714 is closed. The process of this cycle consumes almost 90% of the overall energy to overcome the fluid resistance. High energy consumption cause high difficulty to improve the aircraft's speed.

The engine is located in the wings or the fuselage of the aircraft. FIG. 1 shows the true state of this situation.

The modification on the traditional aircraft aims at resolving two problems: increase in the lift and decrease in resistance.

1. Regarding to the lift problem, the fluid channel communicates with the wings and the fuselage. With the action of the powerful suction in the rear of the engine, the unified big wing is formed. The big wing, as described in this invention, is not only confined to the traditional definition which extends out from the fuselage, but to the entire aircraft including the fuselage, the wings, the engine as a whole, so that a huge pressure difference between the upper and lower wing surface provides the source of huge lift.

2. Regarding the fluid resistance problem, at least one port at the front end of the aircraft inhales the high-speed fluid into the flow channel to form a relatively negative pressure zone in front of the aircraft. The resistance of the forward fluid wall is therefore reduced. At least one port on the external surface of the fuselage imports the fluid around the aircraft into the fluid channel so that a relatively negative pressure zone is formed around the aircraft, contributing to a decrease in the resistance of the fluid hole. The exit at the rear of the aircraft emits a large amount of high-speed fluid to block the enclosure of the fluid hole mouth, so that the small negative pressure area and the large negative pressure zone can not form. Therefore, the fluid resistance problem encountered in the conventional aircraft can be solved.

The fluid wall is the source of resistance for vertical fluid. The fluid hole is the source of resistance for lateral fluid. The fluid hole mouth is the source of resistance for the small negative pressure zone of the rear. The area around the fuselage is the source of resistance for the large negative pressure zone.

According to the above theory and design principle, the implementation details of various embodiments of the present invention are as follows.

Figure 2:
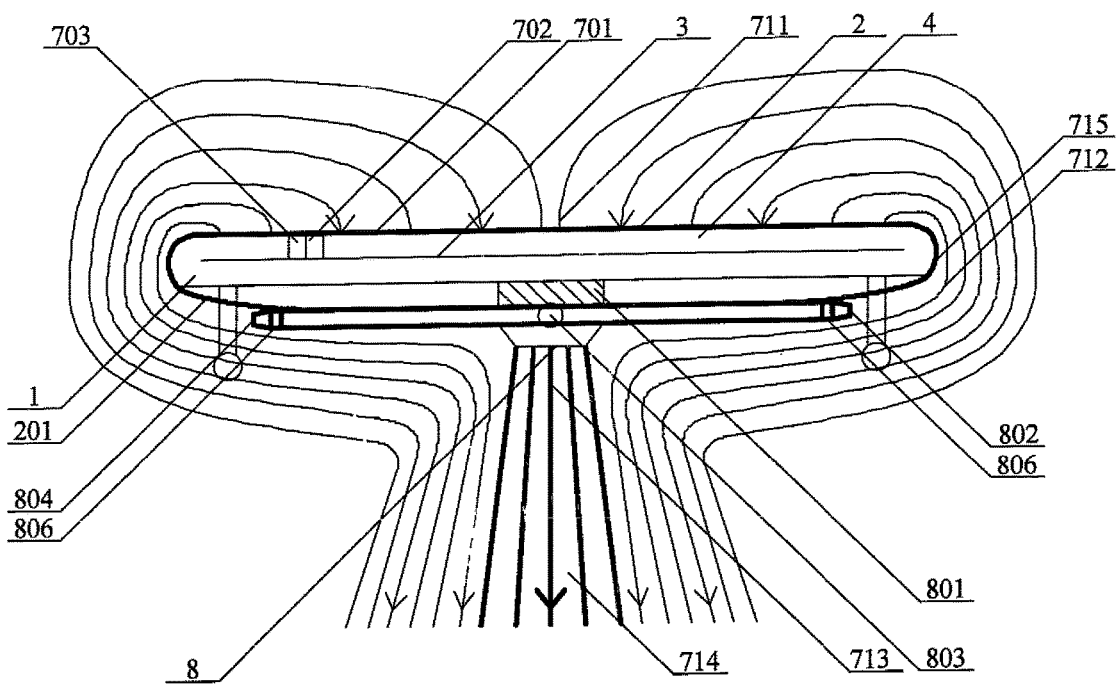
FIG. 2 is a side view schematically showing an aircraft generating a lift from an interior thereof, further with schematic view of the resistance, according to a first embodiment of the invention.
Figure 3:
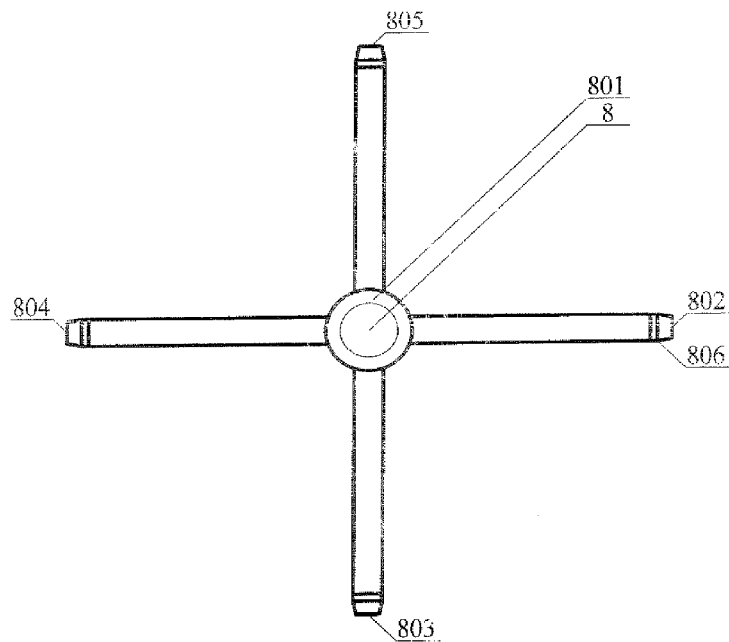
FIG. 3 is a top view schematically showing an aircraft generating a lift from an interior thereof, according to a second embodiment of the invention.
Figure 17:
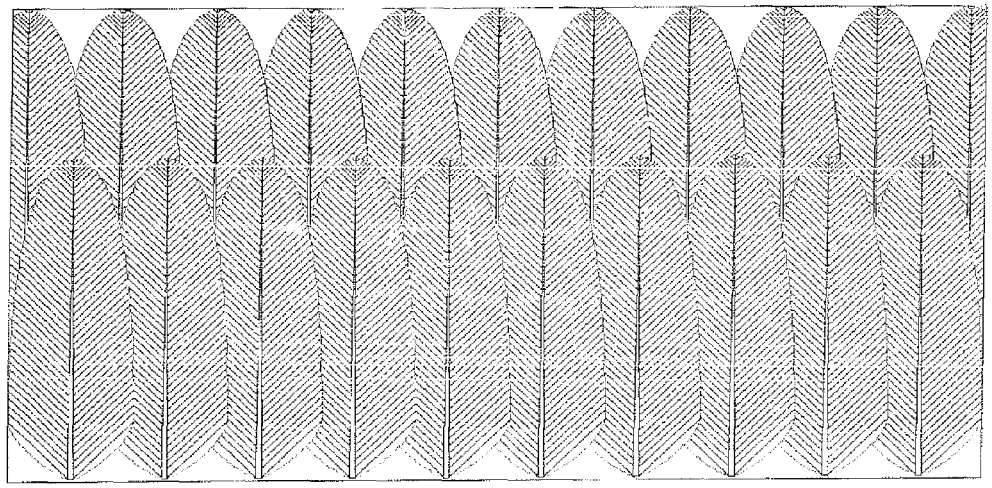
FIG. 17 is a schematic view showing feather-like surfaces of an aircraft generating a lift from an interior thereof, according to the invention.

In the first embodiment, as shown in FIG. 2 and FIG. 3, a flight equipment main body 1 includes an outer shell 2 and inner shell 3. The inner shell 3 communicates with a fluid channel 4 having at least one partition. On an upper surface of the outer shell 2 is located at least one first port 701 or on a periphery of the outer shell 2. Each of the first ports 701 and a second port 702 has a controller 703 to control a spoiler panel which has a curved upper surface and a flat lower surface which can act like a shutter when closed or open. The upper and lower surfaces of the spoiler panel are feathery. As shown in FIG. 17, when the fluid flows in the port through the curved surface of the feathery spoiler panel, the flow path becomes longer, the fluid flows faster with lowered resistance. At the middle of the bottom of the outer shell is equipped with a jet engine 801. The jet engine 801 has an air-in vent communicating with the fluid channel 4, and an air-out vent communicating with ports 8, 802, 803, 804, 805, each port is controllable for a closing and opening operation. A steering head 806 guides the direction of each port.

When the jet engine 801 works, a strong suction intakes the fluid of moving fluid wall 711 into the fluid channel 4 from the first port 701 and the second port 702 to form a relatively negative pressure area on the upper surface of and around the equipment main body 1, significantly reducing the resistance of moving fluid. But the fluid path, the area that the fluid flows over, and the flow speed for the fluid inside the fluid channel 4 are much larger than those on the external lower surface of the outer shell 2 in the natural state of flow. With the powerful suction of the engine 801, the long path, large area, high-speed fluid and low pressure for the fluid inside the fluid channel 7 results in great lift. Such a huge lift in the fluid channel 4 is generated within a large-area fast moving fluid, filling inside the equipment main body 1 and then extending to the upper surface of and around the outer shell 2 communicating with the equipment main body 1. This creates an enormous pressure difference from the lower surface where the fluid flows in the natural state. This pressure difference is much larger than that generated by conventional wings or propeller pressure. A curved bottom plate 201 is provided to facilitate the smooth passage of the fluid and collect the fluid at the exit 8, so as to effectively occupy the space of the small negative pressure zone 713, reducing the size of the small negative pressure zone 713. Meanwhile, the steering head 806 turns down to guide the exits 802, 803, 804, 805 down, so that the jet engine 801 emits high-speed fluid from the exits 8, 802, 803, 804, 805, generating a huge lift to push the equipment main body 1 lift with very low energy consumption. When the equipment main body 1 flies, the engine 801 emits all the fluid inhaled through the ports out of the exit 8. A large amount of high-speed fluid forces the fluid hole 712 to block the fluid hole mouth 714, so that the resistance has to change from negative to positive. The high-speed fluid emitted from and around the exit 8 jointly fills the small negative pressure zone 713, stopping the formation of the large negative pressure zone surrounding the equipment main body 715. In the air, it is allowed to fully open the ports 701,702. The fluid hole 712 tightly wraps the equipment main body where the fluid is inhaled into the fluid channel 4, thereby forming a relatively negative pressure zone around the equipment main body. This creates a lot of pressure difference from the external surrounding fluid, and thus provides a greater lift.

While the fluid resistance is greatly reduced, the aircraft is driven by the engine 801 to travel at high speed in the air. By closing other exits and only opening the exit 802 to emit the fluid toward the rear of the equipment main body 1, the equipment main body 1 will fly forward. Similarly, the equipment main body 1 can move backward and forward, turn left and right or at any angle.

In the view of the above, the new aircraft has a very simple structure. As long as in the movement direction of the aircraft, fluid resistance around the aircraft can be absorbed into the fluid channel to significantly reduce the fluid resistance by means of equitable distribution of certain amount of ports proportional to the area of the relatively negative zone. The decrease in the fluid resistance depends on the increase in the lift generated.

As a basis for the flight platform, a casing with a fluid channel between its inner shell and outer shell is placed on this platform. The shell can be of a semi-circular, spherical, oval-shaped or triangular shape and communicates with the fluid channel 4 of the platform. As long as the fluid channel within the shell communicates with the equipment main body and the engine, a new-generation aircraft of a variety of shapes and having great lift can be achieved. Alternatively, at the very middle of the equipment main body is formed a fluid channel in shape of circle, disk, garment or pyramid. The aircraft in this invention also includes an inflatable plane, an inflatable flying vehicle, traffic airplane capable of moving in the water, land and air. The aircraft produced according to the configuration described in this invention is simpler more applicable because of its improved lift coefficient, flying speed and energy efficiency compared to the conventional aircraft. The engine can be mounted on the top, the rear and the front of the aircraft.

In addition, for the propeller-powered helicopter, the high-speed rotation of propeller at the top thereof drives a great number of high-speed fluid to emit downward, forming a fluid wall and a fluid hole. A small negative pressure zone forms at the lower part of the middle of its fuselage while a large negative pressure zone forms surrounding the fuselage. FIG. 2 illustrates the true state of this situation.

Figure 4:
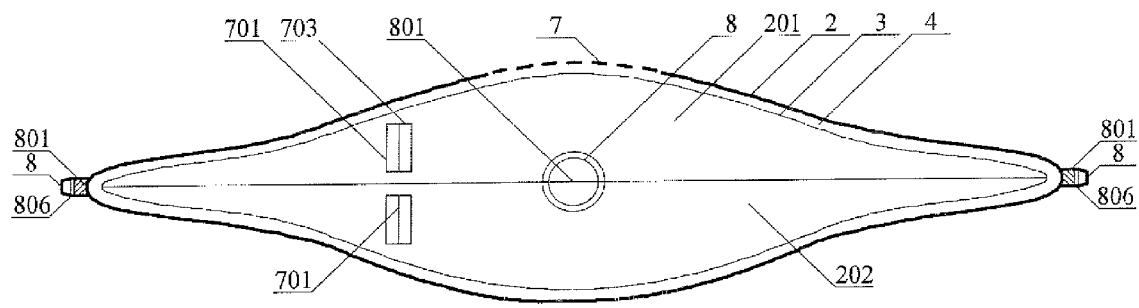
FIG. 4 is a side view schematically showing an aircraft generating a lift from an interior thereof, according to a second embodiment of the invention.

A second embodiment of the invention, as shown in FIG. 4, is the same as the first embodiment, except that the equipment main body radically extends out from its center to form a flyable saucer having the fluid channel formed by the inner shell 3 and the outer shell 2. The upper half shell 201 has a port 7, at least one port 701 and a controller 703, and communicates with the fluid channel 4 to form a negative pressure zone. The lower half shell 202 has a closed port to form a positive pressure zone. At the front, rear, right and left around the center of the flyable saucer is respectively located a jet engine 801. The jet engine 801 has an air-in vent communicating with the fluid channels 4 and an air-out vent communicating with the exit 8. The steering head 806 controls the direction of the exit 8. The four exits are turned down by the steering head 806, pushing the flyable saucer upward. In the air, only the right jet engine 801 can be actuated to emit the fluid from the exit 8 for pushing the flyable saucer forward. Similarly, the flyable saucer can be driven to move in a particular direction by actuating the specific engine located in that direction.

In the air, it only needs to open the port 701 of the lower half 202 to let the fluid at the bottom to flow faster than at the top, so that the lift quickly disappears and the flyable saucer can be down. If the port 701 of the upper half 5 opens, then the flyable saucer rises rapidly. If a port 701 in a particular direction as needed, a desired pressure difference will generate on the shell of the flyable saucer to shift the flyable saucer into that particular direction.

Figure 18:
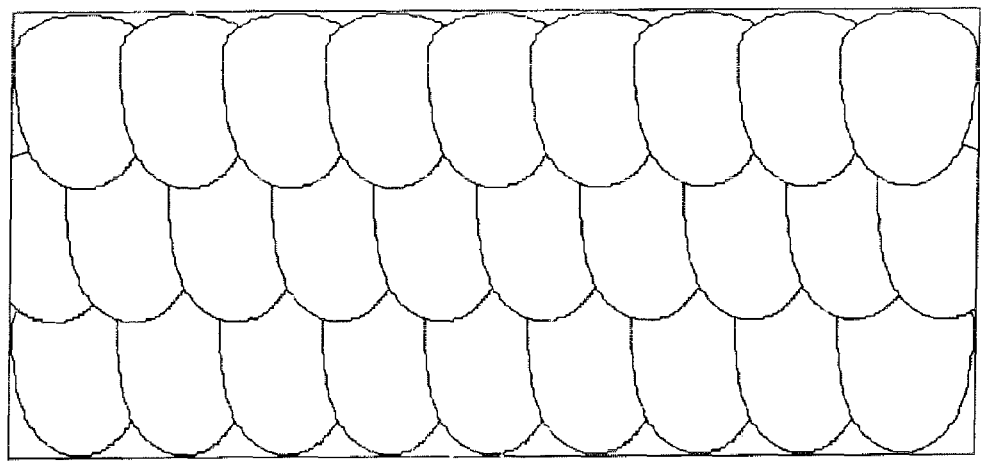
FIG. 18 is a schematic view showing scale-like surfaces of an aircraft generating a lift from an interior thereof, according to the invention.

In a case that the engine is replaced with suction motor of high water-absorption power, it becomes a submersible vehicle of new structure which the spoiler panel in the port is replaced with a scale-like spoiler, as shown in FIG. 18. Water in the fluid channel substitutes a water container of a general-purpose submarine, saving valuable space of the submersible vehicle. By means of opening the port 701 of the lower half, a submersible vehicle can quickly rise and dive.

With rational design of front and rear jet engines, the flyable saucer can travel in the air. The flyable saucer is equipped with two suction motors at its right and left sides to enable it traveling in the water. The engines may be controlled to prevent water from entering inside of the saucer. When the flyable saucer leaves from the water, the suction motors actuate so that it can move both in the air and water.

In another embodiment of the invention, as shown in FIG. 3, no engines and exits is located neither at the center nor around the flyable saucer, but only an engine 801 at the bottom center thereof. The air-in vent communicates with the fluid channel 4, the air-out vent and the exits 8, 802, 803, 804, 805.

Figure 5:
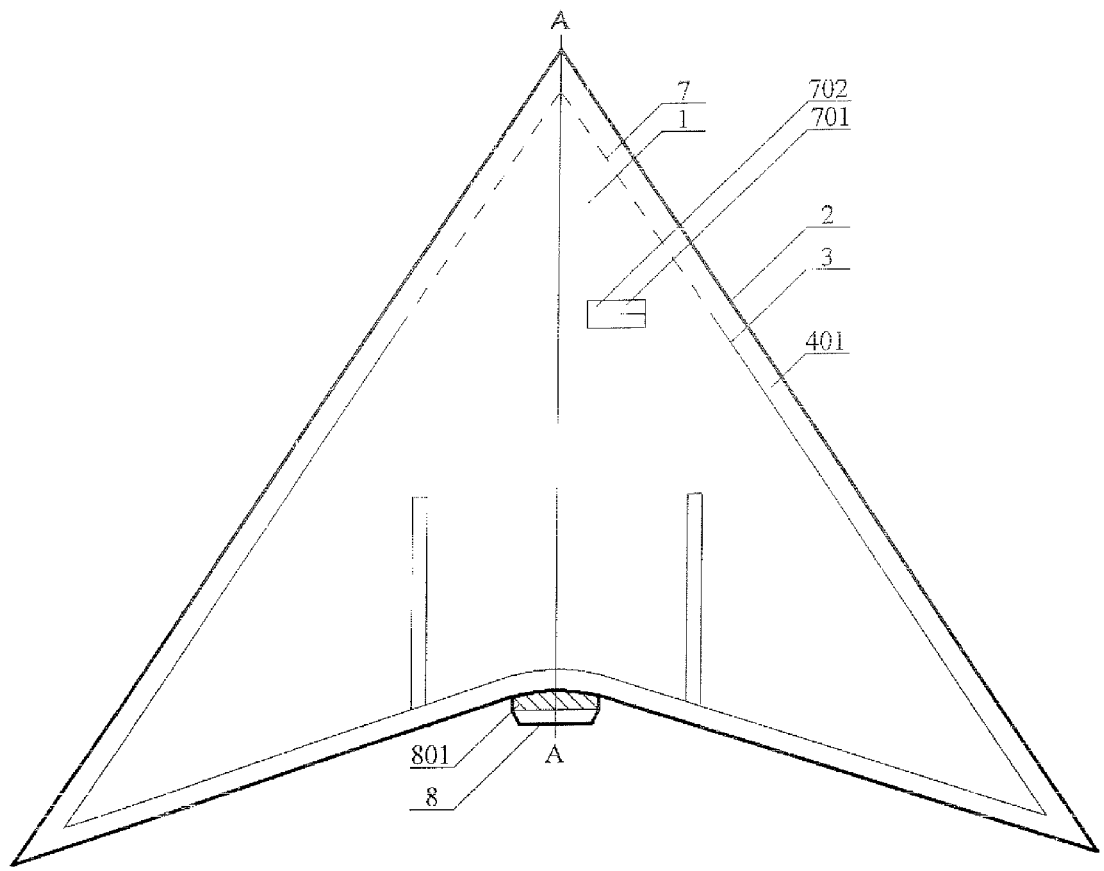
FIG. 5 is a side view schematically showing an aircraft generating a lift from an interior thereof, according to a third embodiment of the invention.
Figure 6:
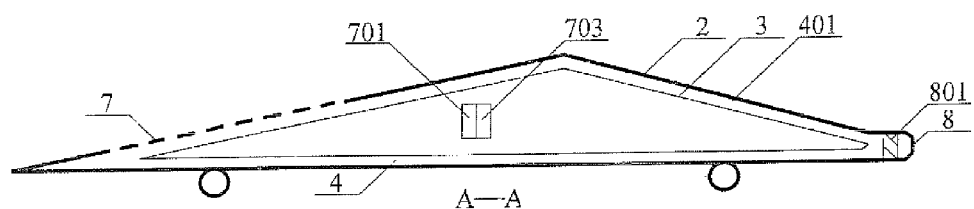
FIG. 6 is a front view schematically showing an aircraft generating a lift from an interior thereof, according to a forth embodiment of the invention.
Figure 7:
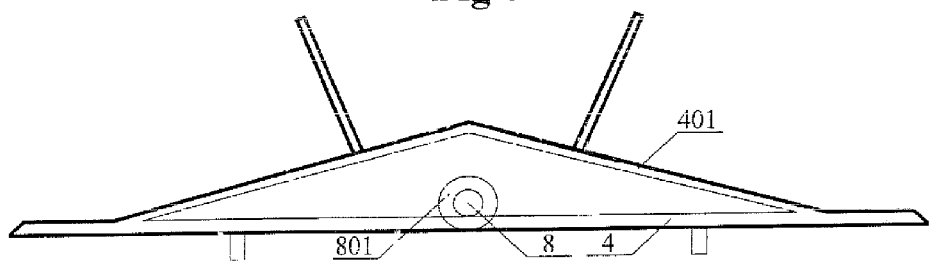
FIG. 7 is a top view schematically showing an aircraft generating a lift from an interior thereof, according to a fifth embodiment of the invention.

In a third embodiment, as shown in FIGS. 5, 6, 7, a triangular aircraft has the same structure as that in the first embodiment, except that a triangle shape is formed by extending outward from the equipment main body in the front, rear, right and left directions. A fluid passage is formed between the outer shell 2 and the inner shell 3 to communicate with the fluid channel inside the equipment main body. The engine 801 is located in the rear center, with its air-in end communicates with the fluid channel 4 while the air-out end communicates with exit 8. If the fuselage is large, more than one engine can be additionally mounted at its rear. All the straight-line parts of the aircraft are proportionally changed to be curved. Thereby, a novel streamlined aircraft is achieved.

Figure 8:
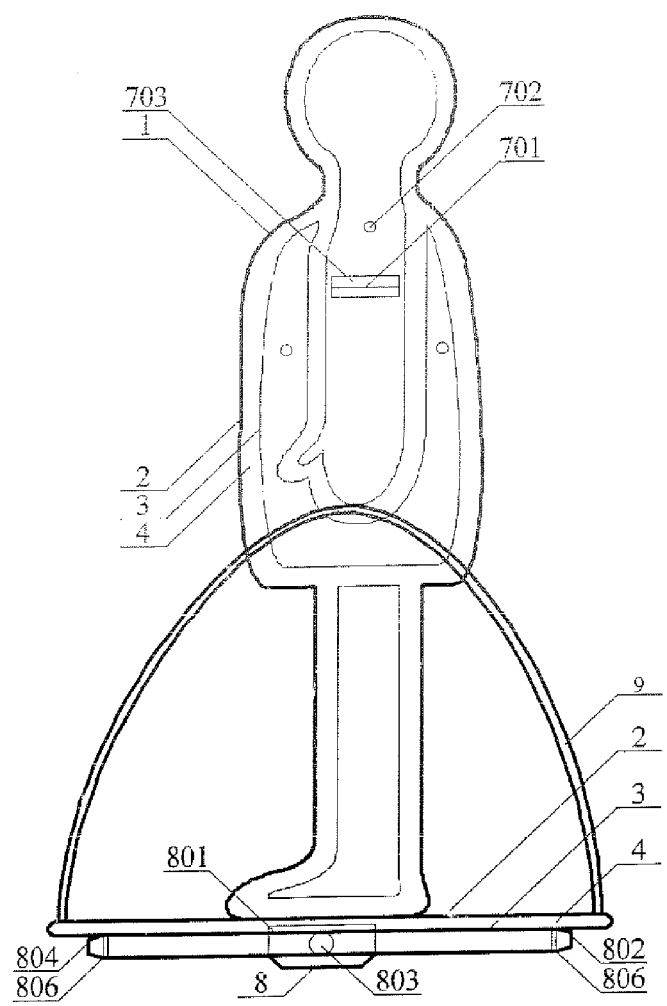
FIG. 8 is a side view schematically showing an aircraft generating a lift from an interior thereof, according to a fifth embodiment of the invention.

In a forth embodiment, a garment-shaped flight vehicle, namely, flight suit, as shown in FIG. 3 and FIG. 8, has the same structure as the second embodiment, except that the flight vehicle has a fluid channel 401 between an outer covering 2 and an inner covering 3 to communicate with the fluid channel 4 in the equipment main body. At least one controller 703 is located on the outer covering 2 to control the air-in angle of the ports 701, 702 communicating with the fluid channel 401. A holder 9 is located at each of the right-hand side and the left-hand side for the user to conveniently hold and keep them balanced. The holders can be also mounted at front and rear of the equipment main body. The inner covering 3 is impermeable for water and air. The outer covering 2 is thoroughly feathery, as shown in FIG. 17, in order to reduce the fluid resistance.

When the jet engine 801 works the generated huge suction powerfully drains the external fluid into the fluid channel 4 through the adequately arranged ports 701, 702 of the outer covering 2. The powerful suction of the jet engine forms a relatively negative pressure zone around a user's body. This creates a great pressure difference from the bottom plane of the flight suits, resulting in a lift. When the fluid is emitted downward through the exits 8, 802, 803, 804, 805, the flight suit is easy to move upward. If only the exit 802 opens while other exits close in the air, the flight suit moves forward. Similarly, the flight suit can move backward, right or left. In the air, the flight suit can turn to any specific direction by means of generating pressure difference formed by emitting the fluid from a specific exit which can be opened or closed as needed.

Because the flight suit sucks the fluid resistance in the movement direction into the fluid channel under the action of the jet engine, the relatively negative pressure zone has formed around the flight suit to create a great pressure difference from the bottom plane. Besides, there is also a huge pressure difference between the flight suit and the surrounding fluid. A great lift is therefore generated.

The flight suit is easily driven to fly by the power. After the fluid resistance in the movement direction is sucked into the fluid channel, the relatively negative pressure zone around the flight suit has been formed. In this state, the shell of any shape is easy to fly. Accordingly, a more aerodynamic shape is favorable to reduce the fluid resistance. Thereby such a structure is very easy to make a flying chair, or a small flight vehicle suitable for the human body.

In another embodiment, the bottom of the equipment main body can be easily changed to a baggage of backpack shape. The jet engine 801 has an air-in end communicating with the fluid channel 401 inside the flight suit. The air-out vent communicates with each exit so that a pressure difference forms between the upper and lower parts of the flight suit or surrounding fluid by means of the control of the ports. A huge lift is thereby generates for another type of flight suit. If the jet engine 801 is replaced with the suction motor, the entire surface of the outer covering 2 is full of scales as shown in FIG. 18 in order to reduce the water resistance. A diving suit power-driven in the water is thereby achieved. If the engine is replaced with a low-power turbofan engine and the inner covering with soft and comfortable material, then a security suit with improved jumping and running performance for anti-terror officers and police is thereby achieved, which can greatly enhance the combat capabilities. If the engine power is further reduced, then an appliance for the purpose of fitness, rehabilitation and health care is thereby achieved.

Figure 9:
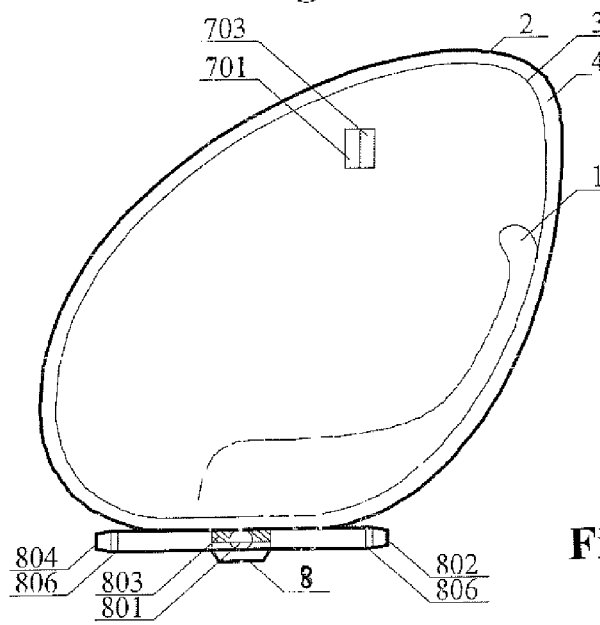
FIG. 9 is a front view schematically showing an aircraft generating a lift from an interior thereof, according to a fifth embodiment of the invention.

In a fifth embodiment, a small airplane, shown in FIG. 3 and FIG. 9, is the same as the first embodiment, except that a casing has a shape of small airplane formed by extending outward from the equipment main body of the small airplane in the directions of front, rear, right and left. Inside the shell contains a chair 1, the fluid channel 4 between the outer shell 2 and the inner shell 3. The fluid channel 4 communicates with at least a port 701 having a controller 703 inside thereof on the outer shell 2. The air-in end of the jet engine 801 communicates with the fluid channel 4 while the air-out end communicates with the exits 8, 802, 803, 804, 805. In the air the port 701 on the desired direction can be opened or closed. If the port 701 opens, a pressure difference generates between the port 701 and the outer shell 2 so that the small airplane is driven into the desired direction. Therefore, the world's smallest non-wing and non-propeller man-carrying aircraft is achieved, which has a great market.

Figure 10:
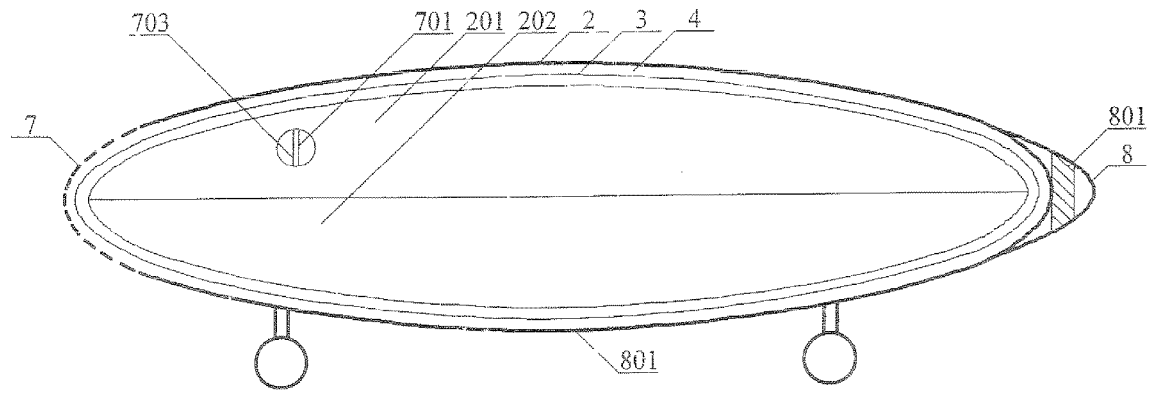
FIG. 10 is a side view schematically showing an aircraft generating a lift from an interior thereof, according to a sixth embodiment of the invention.

In a sixth embodiment, an inflatable aircraft as shown in FIG. 10 is the same as the first embodiment, except that the equipment main body of the inflatable aircraft has a casing of shape formed by extending outward from its center in the directions of top, bottom, right and left. The inflatable aircraft looks like the conventional aircraft, but has no wings and tail. The fluid channel 4 is between outer shell 2 and the inner shell 3, which surround the whole inflatable aircraft. The inner shell 3 is a dual-layered hollow inflatable space. After the inner shell 3 is full of air, the certain distance between the outer shell 3 and the inner shell 2 is the fluid channel 4 which communicates with the air-in end of the rear engine 801. The air-out end of the engine 801 communicates with the exit 8.

The outer shell 2 of the oval-shaped inflatable aircraft is regarded as a wing thereof. Because of the powerful suction of the turbofan engine 801 in the oval-shaped fluid channel 4, the fluid flows very quickly. The fluid flows along the spherical route of up to 180°. The flow channel 4 under the powerful suction of the engine, the path length is long, the velocity is high, and the air pressure is low. Such a lift generated from the internal fluid channel 4 passes through each of the ports 7, 701 until reaches the upper hemispherical half 201 to form a huge pressure difference from the lower hemispherical half 202. The lift and carrying capacity thus created are great.

Such an inflatable aircraft benefits by high-flight-speed characteristics as the conventional aircraft had, and floating characteristics as a lighter-than-air airship has. It has low manufacturing cost. It became a carrying aircraft by inflating and easy to fold by deflating when not used folded. The aircraft and airship are two completely different types of aircraft, but can be combined together in this invention to produce a low-cost and superior-performed carrying aircraft. The outer shell 2 matches the inner shell 3 which can be inflated as a aircraft in a shape of dome, oval and other shapes. The aircraft is simpler than the traditional aircraft from manufacturing aspect. The inner shell 3 can also be a general shell without any inflatable layers.

When the aircraft is to rise, the port 701 of the upper hemispherical half 201 opens by means of the controller 703. When the aircraft is to descend, the port 701 of the lower hemispherical half 202 opens. Similarly, the aircraft shifts right or left by opening the port 701 on the right side or left side opens turn left or right anterior part of import, the aircraft to the left or right. Therefore, the change in flight direction can be achieved by opening ports in the desired directions.

Figure 11:
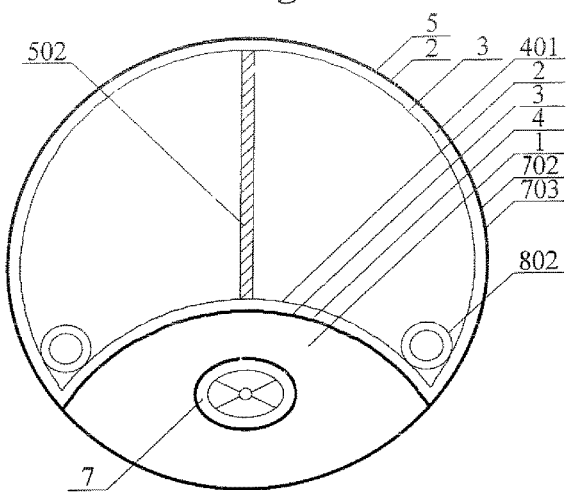
FIG. 11 is a side view schematically showing an aircraft generating a lift from an interior thereof, according to a seventh embodiment of the invention.

In a seventh embodiment, a circular-wing aircraft, shown in FIG. 10 and FIG. 11, is the same as the sixth embodiment, except that its oval-shaped fuselage is equipped with side wing like conventional aircraft, but the side wing surrounds the whole fuselage to form a circular wing 5. Thereby, the reliability and the safety of the aircraft greatly improves. At the circular wing 5, the fluid passage 401 is formed between the outer shell 2 and the inner shell 3 to communicate with the fluid channel 4 of the fuselage. On the shell 2 of the outer shell 2 is located at least one port 702 having a controller 703. The port 702 communicates with the fluid passage 401. Each of right side and left side of the circular wing 5 has an engine 802. The rear of the fuselage has a holder connecting to and supporting the circular wing 5.

When the turbofan engines 802, 801 work to power the circular-wing aircraft, especially when the rear turbofan engine 801 generates a strong suction, the fluid resistance is sucked at high speed from port 7 at the front of the fuselage and the port 701 at the upper surface 201 of the fuselage to form a relatively suction negative pressure zone. Thereby, the resistance of the fluid wall and fluid hole greatly reduces. Meanwhile, a negative pressure differs between the upper and lower surfaces of the fuselage results in a big lift. At this moment, the port 702 on shell 2 of the circular wing 5 generates powerful suction to suck the resistance of the fluid hole into the fluid channel 401, so that the surface of the outer shell 2 forms a relatively negative pressure zone. Since the difference of fluid speed between the external and internal parts of the circular wing, a huge pressure difference generates between the outer shell 2 and inner shell 3 of the circular wing 5 to bring the huge lift to the circular wing 5.

In light of the above, due to the communication of the fluid channel 4 with the fluid passage 401, the engine powerfully sucks the fluid from the ports 7, 701, 702. In this circumstance, the fuselage and the wing unify to be a big wing to provide stronger lift. Then the engine 801 powerfully emits the sucked fluid out of the exit 8 to block the fluid hole mouth from being closed, forcing the surrounding fluid hole to stop the flow of the fluid from the fluid hole mouth so that the resistance has to change to be positive from negative. The high-speed fluid around the exits instantly jointly fills up the small negative pressure zone at the rear of the aircraft. Therefore the big negative pressure zone of the fluid hole is not able to form, but instead adds more pushing force to the aircraft. It is an ideal flight state that the relatively negative pressure zone is on the front of the aircraft and on the fuselage, while the positive pressure zone is at its rear.

For the small circular-wing aircraft, the engine 802 can be optionally removed from the circular wing 5. The circular wing can also be of rectangular, triangular, oval, and domed shape, etc.

Figure 12:
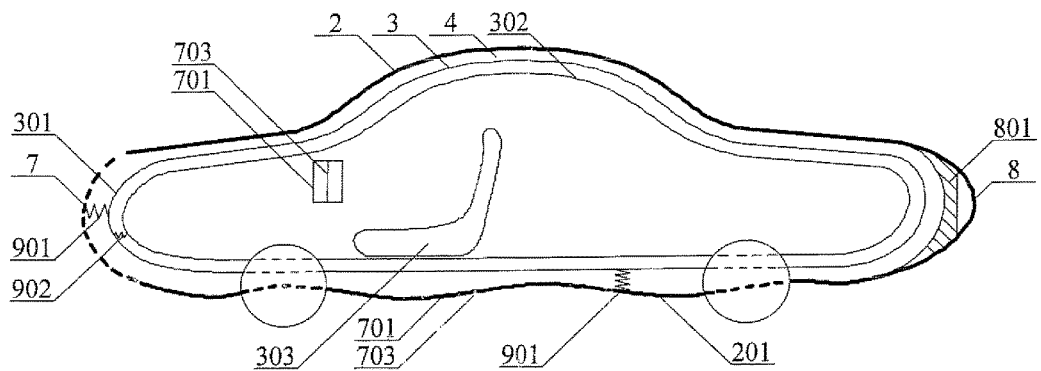
FIG. 12 is a side view schematically showing an aircraft generating a lift from an interior thereof, according to an eighth embodiment of the invention.

In the eighth embodiment, a flight vehicle as shown in FIG. 12 is the same as the sixth embodiment, except that it has the outlook of a car. The inner shell 3 is an inflatable layer. The flight vehicle has an outer layer 301, and an inner 302. The outer shell 2 is made of lightweight and sturdy materials such as carbon fiber, glass fiber, aluminum alloy. The inflatable layer has a plurality of springs 902 distributed around. Between the outer shell 2 and the outer shell 3 is distributed a plurality of springs 901. At the bottom of the outer shell 2 are located some spoiler panels 201 arranged in a manner that a convex surface of one spoiler panel faces a concave surface of its neighboring spoiler panel. A seat 303 is also inflatable.

When the engine 801 works, the first, second and fifth ports 7, 701 suck a great amount of fluid on the external surface of the outer shell into the fluid channel 4, so that an enormous pressure difference forms between an upper half and a lower half of the vehicle, resulting in a great lift which enables the automobile car to take off on a very short path. When only the third port 701 opens, the fluid speed at the bottom of the vehicle is higher than the top thereof, and thus the lift disappears. When the vehicle runs on the ground, the fluid pressure at the top is slightly higher than the bottom due to the changed state of fluid distribution. Thereby, the upper shell of the vehicle can be steadily pressed by that fluid to provide an improved traction. At this point, compared to a Mercedes-Benz car of more than 2 tons at the conditions of the same size and speed, the vehicle of the invention is more stable and more secure. It is known that a part of weight consumes a part of power. For example, an inflatable vehicle has the weight of 200 kg, even lighter, which is a ⅒ of the weight of a Mercedes-Benz car. In other words, it could be saving 90% or more of energy. This saved energy is what has been paid for overcoming the lift resistance by weight from the conventional aspect in the vehicle industry over hundreds years. At this point, the inflatable vehicle could move in the air and on the ground by using a low-power engine.

In addition, under the same conditions, the flow rate inside the fluid channel is much higher than outside the fluid channel. The spoilers 201 makes the flow path longer than the top of the vehicle. Therefore the fluid flows through the fluid channel 4 via the bottom of the vehicle at higher speed than via the top of the vehicle, resulting in the disappearance of the lift resistance. At this moment, it is particularly suitable to use green energy as the power source of the vehicle. For example, a fuel cell, a solar energy or compressed air can be used as a driving force to provide the motor with the required power to directly drive the wheels, so that the inflatable car can be driven like an ordinary car.

In case of a car accident in which an impact coming from the front of or around the vehicle, the impact can be conveyed to the inflatable layer 3 and a core spring 902 through surrounding springs 901 for buffering the impact force and thereby greatly increasing the security.

In another embodiment, it is the same as the above embodiment, except that the outer shell 2 is the inflatable layer, or the inflatable layer is between the outer shell 2 and the inner shell 3.

Figure 13:
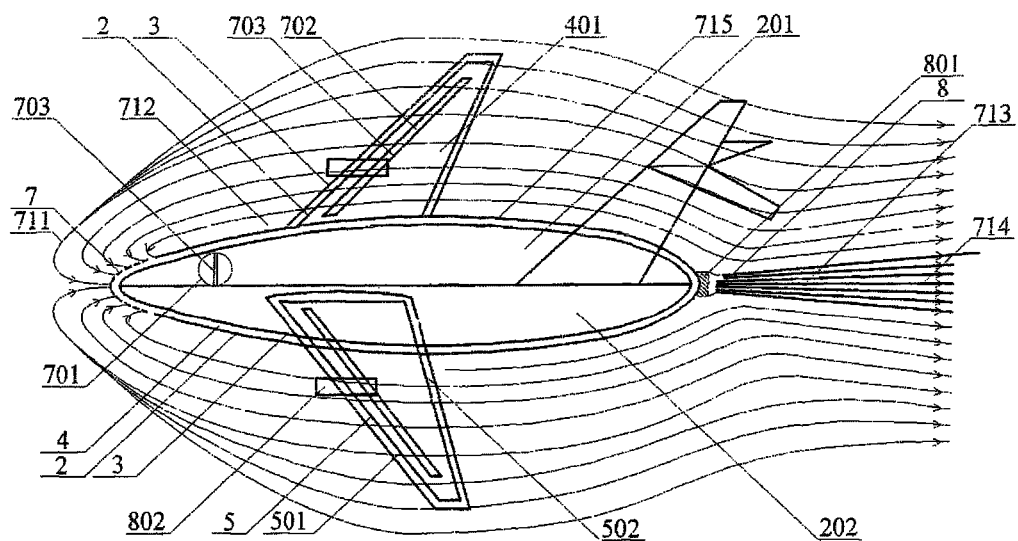
FIG. 13 is a side view schematically showing an aircraft generating a lift from an interior thereof, according to a ninth embodiment of the invention.

A ninth embodiment, shown in FIG. 1, FIG. 10 and FIG. 13, is the same as the sixth embodiment, except that the airplane is equipped with wings and a tail, in which under each of the wings is located at least one motor 802. The outer shell 2 and the fluid contacting surfaces are feathery so as to reduce the fluid resistance. Because the fluid resistance is proportional to the windward side of the airplane, so there is with the front fuselage shell into the same area, the fifth port 7 of the same area as the fuselage at the front of the airplane sucks the resistance of the fluid wall into the fluid channel 4 under the powerful suction of the engine to form a relatively negative pressure zone at the front of the airplane. A fluid passage 401 is located between the outer shell 2 and the inner shell 3, communicating with the fluid channel 4 of the airplane. On the outer shell 2 of the wing 5 is located at least one fourth port 702 communicating with the fluid passage 401. The fluid passage 401 has a port 501 at its front and an exit 502 at its rear. The port 501 communicates with the exit 502 over the upper surface of the wing. The ports 7, 701, 702, and the exit 501 respectively have a controller 703 to control the feathery spoilers at least one of which has a curved upper surface and a curved lower surface, as shown in FIG. 17.

Curved feathery spoiler so that fluid passing path of variable length, the speed change fast, so the wings, fuselage and engine to form a unified big wing. I mentioned in fifth Import can also be set up within the seven electric control gate (Figure not shown) or a spoiler, using controller 703 to control the electronically controlled door open or together to control different parts of the shell surface of the input gas, which control the flight of the changes in steering or lift. Such use of the negative pressure near the ports to control the vehicle steering is completely different from what has been in the existing technology using the jet engine or propeller to generate the steering power.

When the rear engine 801 works to provide a strong suction effect, the fifth port 7 at the front of the big wing, the first port 701 at the top of the fuselage and the forth port on the upper surface of the wing open to such a great amount of the surrounding fluid into the fluid channel 4 and the fluid passage 401 through the ports 7, 701, 702. Thereby, a layer of the fast-flowing fluid over the upper surface of the outer shell of the big wing, which later joins the layer of fast-flowing fluid inside the fluid channel 4 and the fluid passage 401 to form an upper surface of the big wing. The big wing has an area far greater than the conventional aircraft wings. The greater the wing area, the greater the lift is. Under the action of a powerful suction provided by the engine, the flow speed on the upper surface of the big wing is much higher than that on the lower surface in a natural state. Then, a huge pressure difference between the top and the bottom of the big wing provides a greater lift. Such a lift can be controllable through the engine to increase the carrying capacity, the speed with lowered energy consumption.

At the same time, the outer shell of the big wing and the fluid-contacting surfaces are feathery to reduce the fluid resistance. The feathery spoiler panels controlled by the controllers 703 of each port cover in layers, just like the bird's feather, letting the fluid flow between two neighboring layers of feather. The bird controls its flying speed and direction by steering its feathery wings. So far no fight vehicle can reach the birds' flight state. The controller 703 in the ports 701, 702 can be used to control the states of feathery spoiler panels of the wings and the fuselage in the wet the bird flies. Even at 60°-70°, the aircraft will not lose its control on speed if the fluid leaves the wings. If the aircraft breaks down, the pilot has more opportunity to escape by gliding the aircraft.

At this point, the engine 801 sucks the fluid resistance from the fluid wall 711 and fluid hole 712 into the fluid channel to form a relatively negative pressure zone at the front of and around the aircraft. Then a large number of high-speed fluid is strongly emitted through the exit 8. The fluid from the fluid hole 712 reaches the rear at the same time to close flow hole mouth 714. In the case that a great amount of high-speed fluid is emitted from the exit 8 flows faster than the fluid flowing at the speed equal to the aircraft's speed, the fluid of the fluid hole 712 having the speed equal to the aircraft's speed is not able to close the fluid hole mouth 714, but surrounds the aircraft, forced to change the negative resistance into a positive driving force.

For an exiting aircraft with an engine on its wing, even though an exhaust pipe is used as a rear auxiliary power unit, it still cannot produce a large number of the fluid flowing faster than the aircraft to stop fluid hole mouth from being closed.

When the aircraft takes off, the ports 701, 702 of the big wing open to generate a huge lift at the upper and lower parts of the big wing. The aircraft is thereby easy to take off over a very short runway with reduced energy consumption. The aircraft has an improved carrying capacity on flight, higher flight speed and more saved energy.

The front and the surrounding area of the aircraft have relatively negative pressure which is relative to the original positive fluid pressure.

Figure 14:
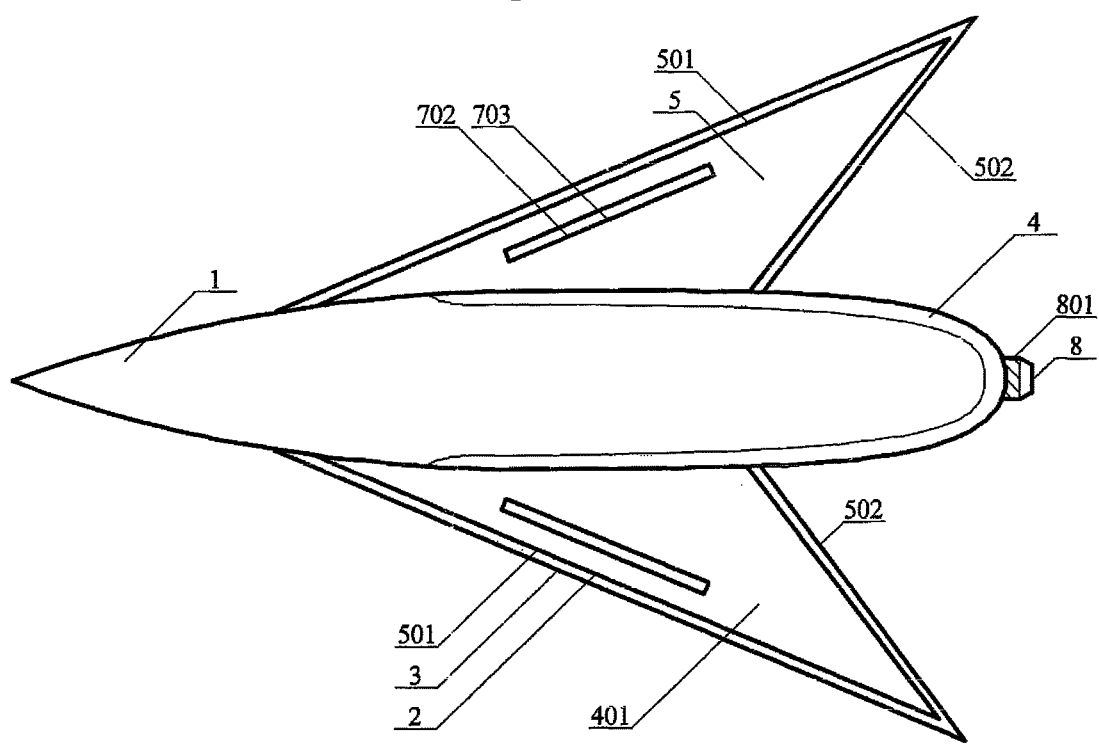
FIG. 14 is a top view schematically showing an aircraft generating a lift from an interior thereof, according to a tenth embodiment of the invention.

In tenth embodiment of the invention, an airplane, as shown in FIG. 14, the same as the ninth embodiment, except that the tube-like fluid channel 4 at either side of the fuselage communicates with the fluid passage 401 on the wings, and the fluid channel 4 communicates with the jet engine 801 to form a big wing by unifying the engine, the wings and the fuselage, especially when the upper surface of the wing becomes the only source of fluid for the engine. A port 501 is located at the front of the wing 5 and an exit 502 is at the rear. At least one forth port 702 is on the upper surface of the wing 5. The controller 703 controls the change in the angle of the ports.

When the jet aircraft flies, the jet engine 801 sucks a large amount of fluid into the fluid passage 4 and channel passage 401 from the ports 501, 702 through the fluid passage 401 and the fluid channel 4 communicating with each other. Especially under the action of strong suction by the engine, the high flow speed and low air pressure in the fluid channel results in strong lift. The lift generated internally extends outward until the upper surface of the fuselage.

This embodiment has completely changed the history of passive generation of the aircraft lift by subtle difference between the curved surface of the upper wing part and the flat surface of the lower wing part at the natural state. In this invention, the powerful suction provided by the engine actively generates the lift. Each forth port 702 on the upper surface of the wing is used as the only one source of fluid for the engine. The fluid speed at the upper surface of the wing is much larger than the lower surface. Since the rotation of the engine is controllable, the fluid speed at the upper surface of the wing is also controllable. If the fluid speed at the curved upper surface of the wing is double of that at natural state, then the obtained lift is double of that at natural state. Similarly, if the fluid speed at the curved upper surface of the wing is higher than that at natural state by 15 times, then the obtained lift is larger that at natural state by 15 times or more. It can be easily implemented by means of the control of the engine. One or both ports 501, 502 can be controlled to close as needed. The fluid flows through the forth port 702 of the upper surface of the wing 5 can also generate a huge lift. A plurality of fluid passages 401 is further provided on the upper surface of the wing from bottom to top. Each fluid passage 401 has a controllable front port 501 and a rear port 502. Each external top has a changeable-angle port 702 communicating with the fluid passages 401 so that that plurality of fluid passages communicate with one another. The fluid passages 401 further communicate with the fluid channel 4 of the fuselage.

At present, no flight vehicle has been found to be able to fly in the air as flexibly as a bird with very little energy for long-distance flight. In order to create a flight aircraft overcoming the above disadvantages, it needs to imitate the mechanism of the bird feathers on their wings. A feather-like layer covers with another feather-like layer. The controllers 703 control the respective feather-like spoiler panels like the bird controls the layers of the feathers, so that the fluid can flow through the multi-layers of spoiler panels as if through the layers of bird's feathers.

Figure 15:
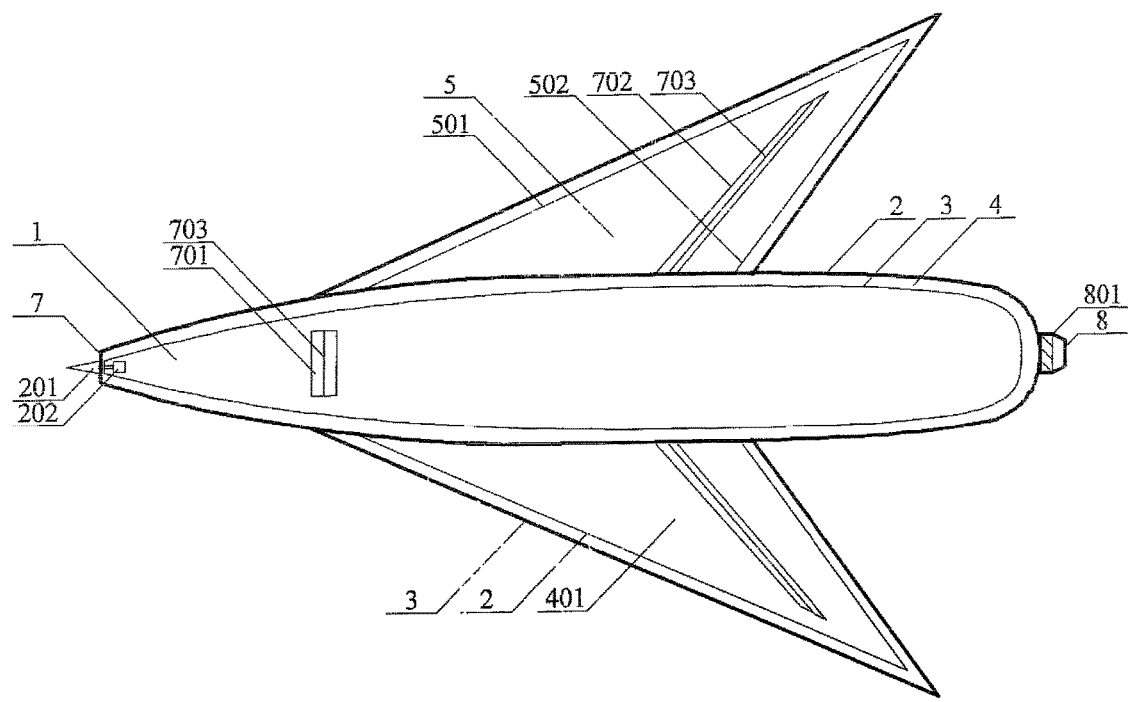
FIG. 15 is a top view schematically showing an aircraft generating a lift from an interior thereof, according to an eleventh embodiment of the invention.

In the eleventh embodiment, a jet airplane, as shown in FIG. 15, is the same as the tenth embodiment, except that the fluid channel 4 between the outer shell 2 and the inner shell 3 surrounds the fuselage. The front port 7 communicates with the surrounding port 701. A cone-shaped rotating head driven by a motor 202 at the front of the airplane. At least one of the first ports 701 of the fuselage and the forth ports 702 of the upper surface of the wing opens to communicates with the fluid channel 4 of the fuselage and the fluid passage 401 of the wing, unifying the fuselage, the wing and the engine to be a big wing. Under the action of the powerful suction of the engine, the upper surface of the big wing forms a relatively negative pressure zone which reduces the resistance of the fluid hole. At the same time, there creates a large pressure difference due to the difference in fluid speed at the upper and lower parts of the big wing, contributing to provide a greater lift than that a conventional aircraft can generate. Then the jet engine powerfully emits the fluids from the exit 8, instantly filling up the small negative pressure area at the rear while inhibiting the formation of the large negative pressure zone. Meanwhile a relatively negative pressure zone forms at the front and the surrounding area to reduce the resistance of the fluid wall and the fluid hole. The rear is a positive driving force zone for the airplane to move in a more ideal distribution of the moving fluid.

A traditional jet engine is located in the middle of the jet airplane's rear to stop the fluid hole mouth from being closed and eliminate the resistances at the large and small negative pressure zones. However, the wings of the jet airplane produce a very limited lift. Its fuselage is designed to mainly overcome the resistances of the fluid wall and the fluid hole with huge energy. The location of its air-in passages at both sides or the bottom of the wings fails to directly contribute to reduction of the fluid resistance and generation of the lift, but instead enlarges the volume and adds load to the fluid resistance.

Figure 16:
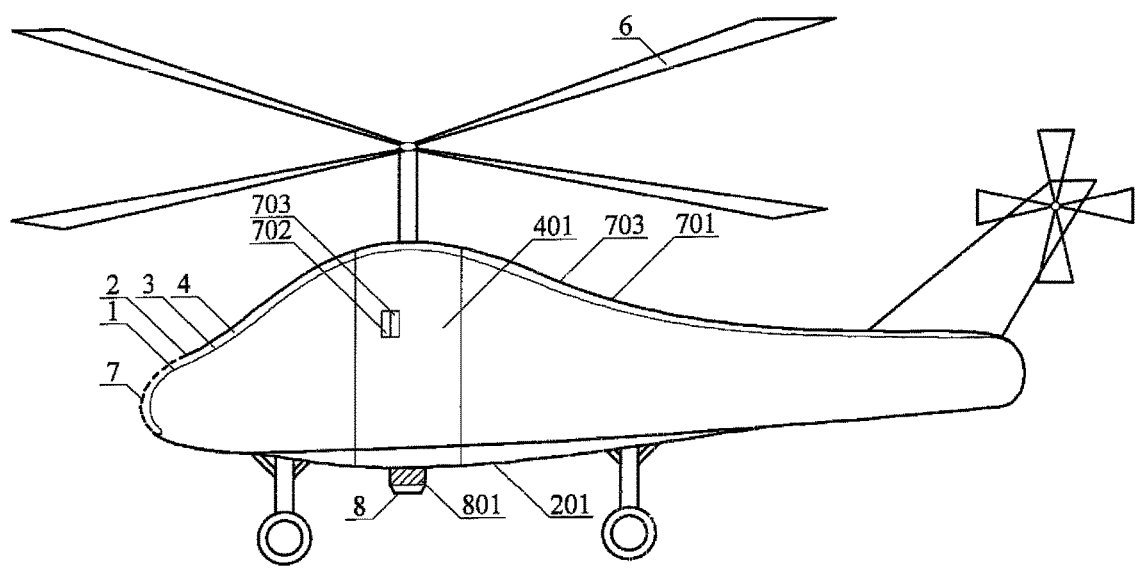
FIG. 16 is a side view schematically showing an aircraft generating a lift from an interior thereof, according to a twelfth embodiment of the invention.

In a 12$^{th}$ embodiment of the invention, a helicopter, shown in FIG. 2 and FIG. 16, has an outer shell 2 and an inner shell 3. A fluid channel 4 and a fluid passage 401, which communicate with each other, form at a certain distance between the outer shell 2 and the inner shell 3, respectively. At least one of ports 701, 702 having a controller 703 on the outer shell 2, and the front port 7 communicate with the fluid channel 4 and the fluid passage 401. The middle of the bottom of the fuselage is located a turbofan engine 801, with its the air-in end communicating with the fluid channel 4 and the fluid passage 401, and its air-out end communicating with the exit 8. A streamlined bottom plate 201 is used to facilitate smooth flow of the fluid which is guided to collect around the exit 8, meanwhile occupying a part of a small negative pressure zone 713 in order to reduce pressure on the small negative pressure zone at the bottom.

When the helicopter is in flight, a propeller 6 rotates at high speed to suck the above fluid and then emit the sucked fluid outward through its bottom to form a fluid wall 711 on the top of the fuselage. The fluid instantly surrounding the fuselage forms a fluid hole tightly wraps the fuselage, bringing the resistance to the helicopter. The continuous flow of the fluid hole allows the fluid to reach a certain distance from the middle of the bottom of the fuselage to close the fluid hole mouth 713. Thereby, a negative pressure zone 713 forms at a distance between the fluid hole mouth and the middle of the bottom of the fuselage. Meanwhile, the surrounding area of the fuselage forms a large negative pressure zone 715. The faster the aircraft, the larger the fluid resistances of the fluid wall, the fluid hole, the large and small negative pressure zones are. This is the main reason why all of today's helicopters have low flight speed but high energy consumption.

At this point the turbofan engine 801 works, powerful suction sucks the fluid resistance of the fluid wall 711 and the fluid hole 712 into the fluid channel 4 and the fluid passage 401 from the front port 7 and the top and side port 701, 702, so that a relatively negative pressure zone forms at the top, the front and the both sides of the fuselage, significantly reducing the fluid resistance of the fluid hole and the fluid wall. Meanwhile, due to a huge suction of the turbofan engine 801, the fluid speeds at the top, the front and the both sides of the fuselage are much greater than that at its bottom. The difference between the fluid speeds at the top and the bottom of the fuselage results in a very big pressure difference which generates the huge lift. At this point, pressure difference between the top and the bottom of the propeller and the pressure difference between the top and the bottom of the fuselage jointly provide much greater lift. Then the turbofan engine 801 powerfully emits the sucked fluid resistances from the ports at a speed greater than the helicopter, forcing the fluid hole to reach the bottom of the fuselage to close the fluid hole mouth 714 to stop the negative resistance. Therefore the great amount of the high-speed fluid is forced to emit around the exit and join to change the resistance from negative to positive. The small negative pressure zone 713 is instantly filled up so that the large negative pressure zone 714 of the surrounding area of the fuselage is inhibited to form, pushing the aircraft to move faster.

In another embodiment of the invention, the fluid channel 4 forms between the inner shell 3 and the outer shell 2, surrounding the fuselage and communicating with the engine located in the bottom or the rear of the fuselage.

In still another embodiment, no fluid channels 4, fluid passages 401 or ports is provided. In the bottom of the fuselage, a small propeller 801 is located a certain distance from the middle of outer shell 2. The upper surface of the small propeller 801 is a certain distance from the middle of the outer shell 2 at the bottom of the fuselage, ensuring that the upper surface of the small propeller can emit the fluid downward after the fluid is sucked, so as to blocking the fluid hole mouth from being closed.

For the existing helicopter using the propeller as the lift source, the theory and the approach of developing a new technology is hard to make a great achievement, no matter the fuselage has one or two propellers. It is because under the circumstance that the propeller sucks the above fluid and then high-speed emits the sucked fluid toward the fuselage, creating the fluid wall and the fluid hole, the helicopter will be stuck in the large or small negative pressure zones generated by the propellers and therefore hard to move, causing energy waste. In this invention, the fluid hole mouth is stopped from being closed, significantly reducing the fluid resistance while forming a new lift source at the top and the bottom of the helicopter. Therefore, the new lift source will, along with the propeller, provide a greater lift. This configuration according to the invention finds the development of the helicopter a new direction.

The above-mentioned descriptions represent merely the preferred embodiment of the present invention, without any intention to limit the scope of the present invention thereto. Various equivalent changes, alternations, or modifications based on the claims of present invention are all consequently viewed as being embraced by the scope of the present invention.

What is claimed is:

1. An aircraft generating a lift from an interior of the aircraft, comprising:
  having a fuselage, engines and wings, having a plurality of ports on surface of a casing of the fuselage and wings, and having a plurality of exits at a tail of the fuselage, and having a fluid channel between the ports and the exits; wherein
  the wings comprising first and second wings located at the left and right of the fuselage;
  the engines comprising first and second engines located under the first and second wings which could generate lift, respectively;
  and
  a third engine, equipped inside the tail of the fuselage and located in the fluid channel, having an air-in vent and an air-out vent, wherein the air-in vent communicates with the ports, and the air-out vent communicates with the exit, wherein
  the third engine drives a fluid to flow within the fluid channel in the casing of the fuselage and wings, so that the fluid speed formed inside the fluid channel and over an upper surface of the casing communicating with the fluid channel is larger than that on lower surface of the casing in natural state, resulting in a pressure difference between the upper and lower surfaces of the casing and thus creating a lift.

2. The aircraft of claim 1, wherein the upper surface of the aircraft communicates with the fluid channel and the third engine to form a big wing having the fluid channel inside wherein with the action of power of the third engine, the fluid speed is greater than that around the lower surface, so as to create a pressure between the top and bottom of the casing to form the lift.

3. The aircraft of claim 2, wherein each port on the surface of the casing communicates with the fluid channel, wherein the port of the upper surface is a first port, the port on the upper surface of the first and second wings is a fourth port, the port at the front in the movement direction is a fifth port.

4. The aircraft of claim 3, wherein at least one of the inside of the ports has a controller and an electrically controllable door or a spoiler panel connected to the controller, the controller controlling an opening and closing of the electrically controllable door or the spoiler panel and an altering of the air-guiding angle of the spoiler panel as well so as to control an amount of air brought in at different parts of the casing and further control a flight direction or lift for the aircraft.

5. The aircraft of claim 4, wherein the spoiler panel in the ports has a curved upper surface and a flat lower surface, or an upper surface and a lower surface of the spoiler panel are curved or flat.

6. The aircraft of claim 1, wherein the equipment main body and the first and second wings include an outer shell and a closed inner shell, the fluid channel being located between the outer shell and the closed inner shell.

* * * * *

UNITED STATES PATENT AND TRADEMARK OFFICE
CERTIFICATE OF CORRECTION

PATENT NO. : 9,745,047 B2  
APPLICATION NO. : 14/295350  
DATED : August 29, 2017  
INVENTOR(S) : Xiaoyi Zhu Page 1 of 1

It is certified that error appears in the above-identified patent and that said Letters Patent is hereby corrected as shown below:

On the Title Page

Item (62) the Related U.S. Application Data reads:  
"Division of application No. 13/864,370, filed on Apr. 17, 2013, now Pat. No. 8,910,903."

Should read:  
-- Division of application No. 13/864,370, filed on Apr. 17, 2013, now Pat. No. 8,910,903, which is a division of application No. 12/699,066, filed on Feb. 3, 2010, now Pat. No. 8,448,892. --

Item (30) the Foreign Application Priority Data is missing and should read:  
-- Jul. 3, 2009 (CN) ............... 200910108576.9 --

Signed and Sealed this  
Fifth Day of May, 2020

Andrei Iancu  
*Director of the United States Patent and Trademark Office*